United States Patent [19]

Matulewicz

[11] 3,741,460

[45] June 26, 1973

[54] APPARATUS FOR PRODUCING A STREAM FEEDER

[75] Inventor: Leonard A. Matulewicz, Toledo, Ohio

[73] Assignee: Owens-Corning Fiberglas Corporation, Toledo, Ohio

[22] Filed: Dec. 7, 1970

[21] Appl. No.: 95,860

Related U.S. Application Data

[62] Division of Ser. No. 733,040, May 29, 1968, Pat. No. 3,579,807.

[52] U.S. Cl. .................. 228/5, 29/157.3 C, 29/475
[51] Int. Cl. .............................................. B23k 1/20
[58] Field of Search ................ 228/3, 4, 5; 72/367; 29/557, 157 C, 157.3 C, 475

[56] References Cited
UNITED STATES PATENTS
1,152,858   9/1915   Stewart ............................... 72/367
2,395,348   2/1946   Sherman et al. ........................ 78/46
2,779,998   2/1957   Bailey ............................... 29/475 X
2,780,000   2/1957   Huet ................................. 72/367 X
3,200,479   8/1965   Peterson ........................... 29/157 C
3,349,465   10/1967  LaPan et al. .................... 29/157.3 C
3,626,531   12/1971  Mayer et al. ....................... 29/557 X Primary Examiner—J. Spencer Overholser
Assistant Examiner—Robert J. Craig

[57] ABSTRACT

Apparatus and method for forming a feeder for flowing streams of filament forming material such as molten glass by deforming tubular members into contoured longitudinal members and subsequently securing the longitudinal members to a plate with orifice openings in alignment with such openings.

5 Claims, 15 Drawing Figures

PATENTED JUN 26 1973 3,741,460

INVENTOR.
LEONARD A. MATULEWICZ
BY
*Stachin & Overman*
ATTORNEYS

APPARATUS FOR PRODUCING A STREAM FEEDER

This is a division of application Ser. No. 733,040, filed May 29, 1968 and allowed Nov. 20, 1970 now U.S. Pat. No. 3,579,807.

BACKGROUND OF THE INVENTION

This invention relates to a stream feeding container or bushing for flowing streams of filament forming material such as molten glass and method and apparatus for making it. More particularly the invention relates to shaping or deformation of tubular members that subsequently are combined with a plate having orifice openings to form a stream feeder for supplying streams of filament forming material such as molten glass.

When producing synthetic fibers or filaments and particularly synthetic continuous filaments useable for textiles from heat softened mineral materials such as molten glass or the like, it is conventional practice to use a stream feeding container or bushing, normally made of a platinum alloy, having a bottom wall or feeder provided with a plurality of orifices through which passes streams of the heat softened mineral material. Suitable apparatus attenuates the streams into continuous fibers or filaments. Further, it has been a practice to fashion the bottom wall or the feeder of the stream feeding container with orificed projections.

Heretofore there has been available only a few practical ways for producing the bottom wall or feeder of stream feeding containers and orificed projections that are normally a constituent of such feeders, especially feeders for feeding streams of molten glass. In one practice the feeder of the stream feeding container, normally made of a platinum alloy, is fashioned with projections from raised portions that may be built-up on the plate by flame-fusing drops or globules of platinum alloys at spaced regions on the plate. Subsequent coining or shaping of the raised portions provides projections of desired shape. Thereafter suitable means such as drilling opens a passageway through each of the heretofore solid base plate and projections to provide a passageway opening through the base plate and extending longitudinally of the projections through which heat softened material may flow. Further, it has been another practice to manufacture feeders or tip sections by securing flanged tubular eyelet-like members in registry with openings in a base plate by welding the flanges to the plate.

The prior art methods and apparatus for producing stream feeders are inadequate and slow. When the orificed projections are made by first forming raised portions on a plate, the formation of such raised portions and subsequent passageway formation, e.g. by drilling, is exceedingly slow. Moreover, when the process includes drilling the passageways, the passageways of the individual orificed projections are non-uniform. "Drill drift" contributes significantly to the non-uniformity between orifice projections by making passageways that do not run axially of the projections. Additionally, apparatus tends to lack the accuracy for 37 on center" drilling, thereby producing orificed projections having axially extending passageways laterally offset varying amounts. Then too, drills tend to produce passageways having differing passageway surface characteristics, which promotes non-uniformity among individual fibers produced from the stream feeding container.

The deficiencies of the prior art have become more acute under modern filament forming conditions where the size and character of the passageways of the projections have become more critical and the number of orificed projections have often increased to 2,000 or more on feeders used for producing glass filaments. Moreover, uniformity of filament diameter is of considerable competitive concern wherein all filaments, e.g. glass filaments, within a bundle require a high degree of uniformity.

The feeders produced using tubular eyelet members in combination with an orificed plate, while providing some advance in the art, are severely limited in use. The orificed projections used to fabricate the tip section are merely simple tubes flanged at one end. Thus, the feeders produced are limited to orificed projections of substantially one configuration, i.e. tubular projections having simple cylindrical passageways and uniform wall thicknesses throughout their length.

The securement of the tubular eyelet members to the orificed plate by welding has provided difficulties. Because during the welding the metal alloy tends to soften, the region of securement becomes somewhat distorted. Softened metal flows radially inwardly of the passageway to somewhat constrict or reduce the cross sectional area of the passageway in a region adjacent to such welding, i.e. passageway portions adjacent to the meeting of the plate and flange of the member.

Further, prior apparatus and method requires that each of the plurality of orificed projections to be ground to a uniform height at their exit or metering ends. Such grinding provides the metering end, i.e. an annulus, with a smooth and even surface.

SUMMARY OF THE INVENTION

An object of the present invention is an improved feeder for a stream feeding container adapted to hold fiber forming material such as molten glass and method and apparatus for making it.

Another object of the invention is a method to produce a stream feeding container with a bottom wall or feeder having orificed projections made from individual tubular members shaped into longitudinal members each having a passageway extending along its length and thereafter securing a plurality of such shaped longitudinal members to a plate having orifice openings with the passageways of the shaped longitudinal members in alignment with the plate openings.

Yet another object of the invention is apparatus and method for producing orificed projections for a stream feeder where the projections have among themselves uniform passageway size and on center locations for producing filaments of heat-softened material such as glass.

Yet another object of the invention is to provide a feeder by welding contoured orificed projections to a plate having openings wherein the passageways of such projections are not constricted by welding.

The above and other objects are attained through apparatus and the method of using it that produces stream feeding containers having feeders or tip sections with orificed projections shaped from tubular members of predetermined length, each having a passageway extending its entire length. Subsequently the shaped longitudinal members are joined to a base plate, e.g. a plate having a plurality of orifice openings. The passageway can be shaped with a taper extending from a location intermediate the passageway ends in increasing cross section towards the base or entrance end of the longitudinal members and terminating the entrance end.

The present invention provides numerous advantages over the prior art. The stream feeder containers may be made more quickly and with significantly higher uniformity. Moreover, the process and apparatus of the invention provides the ability to make new and complex tip configurations that were heretofore impossible to produce.

DESCRIPTION OF THE PREFERRED EMBODIMENTS

While the invention has particular utility in the production of stream feeding containers formed of platinum or an alloy of platinum and including a bottom wall or feeder formed of platinum or an alloy of platinum wherein longitudinal orificed projections or shaped members with passageways for flowing streams of heat softened mineral material such as glass from the container, the invention may be employed wherever one requires the shaping of tubular material into contoured longitudinal member having a passageway extending lengthwise therethrough.

Figure 1:
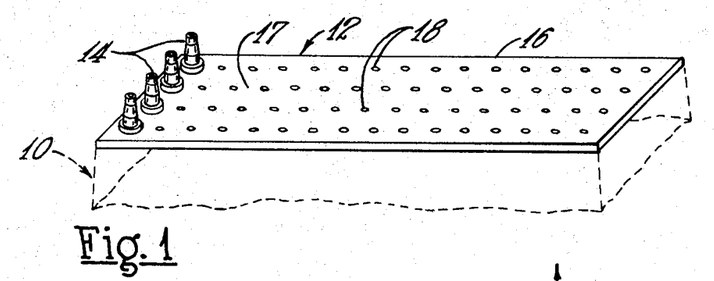
FIG. 1 is a perspective view of a bottom wall or feeder of a stream feeding container or bushing according to the principles of the invention.

FIG. 1 illustrates in inverted position a portion of a stream feeding container or bushing 10 comprising a bottom wall or feeder 12. The dashed lines indicate the side and end walls of the stream feeding container 10, which is shown in inverted position. The feeder 12 includes orificed projections or contoured longitudinal members or tips 14 jutting from and securely fastened at one end to a major surface 17 of a base plate 16, which has orifice openings 18 extending therethrough. The shaped longitudinal members 14 are in axial alignment with the openings 18.

The bottom wall feeder 12 of the container 10 is fabricated of high temperature resistant material such as an alloy of platinum or other suitable material. Likewise the orificed projections or shaped longitudinal members 14 are fashioned of platinum alloy or other suitable material. The alloy of the longitudinal members 14 may contain gold or other constituent fostering non-wetting characteristics for minimizing flooding of softened filament forming materials such as molten glass. Moreover, the stream feeding container construction may include a plurality of feeders 12 in abutting relation and welded or joined together as desired to derive a large number of streams of filament forming material from a single stream feeding container.

Figure 2:
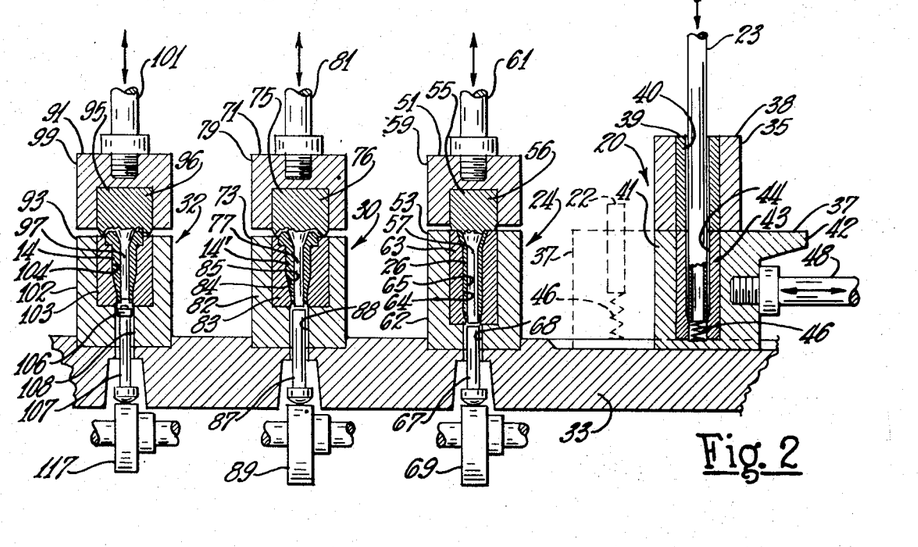
FIG. 2 is a section view in elevation of apparatus having four stations for processing tubular material to produce shaped longitudinal members of a feeder according to the principles of the invention.

FIG. 2 shows preferred apparatus for practicing the invention including four stations for processing or working tubular material into a shaped longitudinal member, e.g. the member 14. The first station 20 is a cutting station providing tubular members of predetermined length from a supply of tubular material. The second station 24 initially deforms the tubular member 22 under compression into a shorter tubular work piece 26 of intermediate shape. The third station further works the tubular work piece 26 under compression into a still shorter longitudinal member 14' of essentially final form. The fourth station 32 coins the metering exit end of the longitudinal member 14' to produce the longitudinal member 14. All stations are on a support 33.

The first station comprises two major parts, an upper unit 35 and a lower unit 37, slideably engaged to shear cut predetermined lengths from a supply of tubular material 23. As shown in FIG. 2 the upper unit 35 is held stationary and includes an outer portion 38 and an inner portion 39 that has a passageway 40 extending through it, such passageway illustrated as being disposed vertically. The inner portion 39, which forms the surface of the passageway 40, is normally made of hardened metal, e.g. carbide. Moreover, the lower or outlet edge of the passageway 40 of the inner portion 39 is a circular cutting edge.

The lower unit 37 moves on the support 33 with respect to the upper unit 35 and includes a housing arrangement and means for moving it. The housing arrangement comprises an outer portion 41 with an extension 42 and an inner portion 43 having a passageway 44 extending through it. The inner portion 43, which forms the surface of the passageway 44, is normally made of hardened metal, e.g. carbide. When the apparatus of the first station is not in a cutting cycle, the passageway 44 of the lower unit 37 is in axial alignment with the passageway 40 of the upper unit 35 to form, in a sense, one passageway. At the lower end of the passageway 44 is a compression spring 46 that presses upwardly against the bottom end of the tubular material 23 in the passageway 44.

As shown in FIG. 2 the means for moving the lower unit 37 includes a shaft 48 mounted for reciprocation by a suitable prime mover (not shown). The shaft 48 fastens at one end to the outer portion 41 and at the other end to the suitable prime mover such as a pneumatic motor or motor driven cam arrangement, which upon demand moves the lower unit 37 on the support 33 to the left as shown in FIG. 2 to position the extension 42 in contact with the upper unit 35. After the lower unit 37 completes its cutting stroke, the prime mover returns the lower unit 37 to its initial position with the upper passageway 40 and lower passageway 44 in axial alignment.

In operation the first station as shown in FIG. 2 cuts the tubular material 23 into tubular members 22 of predetermined length. From above, the tubular material 23 extends through the passageway 40 and a predetermined length into the passageway 44. The compression spring 46 presses upwardly against the lower end of the tubular material 23 in the passageway 44. Upon demand the prime mover through the shaft 48 with speed and force, a snap action, moves the lower unit 37 to the left. As the portion of the tubular material 23 in the passageway 44 travels with the lower unit 37, the tubular material 23 in the passageway 40 rudely engages a portion of the cutting edge of the lower or exit end of the passageway 40 of the inner portion 39 and a clean shear cut of the tubular material 23 occurs.

As indicated by the dashed lines of FIG. 2, the lower unit 37 moves left to a location where the upper end of the passageway 44 is free from obstruction by the upper unit 35. The compression spring 46 "pops-up" the predetermined length of the tubular material 23, i.e. tubular member 22, to expose its upper end from the passageway 44 for easy removal from the lower unit 37.

Suitable means (not shown) transfers the tubular member 22 from the passageway 44 in the lower unit 37 of the first station 20 to a new location at the second station 24.

Figure 3:
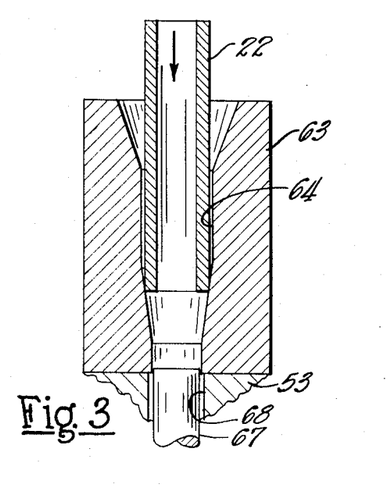
FIG. 3 is an enlarged section view in elevation illustrating an initial position of a predetermined length of tubular material at the second station of the apparatus shown in FIG. 2.
Figure 4:
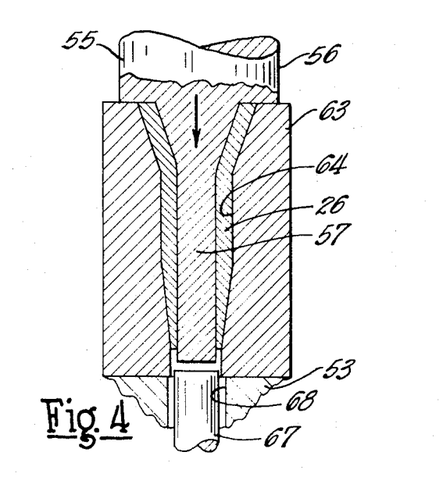
FIG. 4 is an enlarged section view in elevation illustrating an intermediate deformation of the tubular member shown in FIG. 3.

Referring to FIGS. 2 through 4, the second station 24 is a die press including an upper unit 51 and a lower unit 53, which combine to form a matched die press system operating to contour the tubular member 22 under compression into a shorter member of intermediate shape having a shaped passageway and modified external surface. The upper unit 51 includes a die 55 with a base portion 56 and a plunger or quill portion 57. The die 55 is securely fixed at its base 56 to a retainer 59 and is normally made of hardened metal, e.g. carbide. The portion of the plunger 57 adjacent to the base portion 56 is somewhat larger in cross sectional size. From its emergence at the base portion 56 the plunger 57 in cross sectional area to a minimum cross sectional size spaced from the base, the plunger 57 extending uniformly along the remaining length of the plunger 57 with the minimum cross sectional size.

Suitable means reciprocates the upper unit 51. As shown in FIG. 2 the upper unit 51 reciprocates vertically. A shaft 61 secures at one end to the retainer 59 and at the other end to a press ram (not shown). It has been useful to employ a press ram having a capacity in the range of ten tons. The press ram moves the upper unit 51 away from the lower unit 53 and also into metal working engagement therewith.

The lower unit 35 provides a die 63 that matches and aligns with the die 55 of the upper unit 51 to shape the tubular member 22. The die 63 is held securely in stationary relation on the support 33; moreover, the die 63 has a die cavity or passageway 64, which as viewed in FIGS. 2 through 4, flares at its entrance or upper end. Further the die 63 is somewhat reduced in outside cross section at the lower end.

FIG. 3 illustrates the initial position of the tubular member 22 in the passageway 64 of the die 63. The reduced area zone of the passageway 64 permits only partial penetration of the member 22.

In operation the press ram moves the upper unit 51 from a position spaced from the lower unit 53 to engage the lower unit 53, upsetting or "cold heading" the tubular member 22 into the work piece 26 of intermediate shape. As the press ram through the shaft 61 moves the upper unit 51 into engagement with the lower unit 53, the plunger 57 enters the cavity or passageway 64 of the die 63. These matching dies cooperate to work the metal of the tube 22 under compression to "cold head" the tubular member 22 and move material towards the upper end to form the shorter work piece 26. The work piece 26 flares at its upper or base end. The metering end or lower end of the work piece 26 is slightly contour, viz. having a reduced outside diameter and thinner walls.

The second station 24 provides for removal of the work piece 26 from the passageway 64 of the die 63. As shown in FIGS. 2 through 4 a knock-out pin 67 extends upwardly through the support 33 into a passageway 68 communicating with the passageway 64 of the lower unit 53. When the press ram withdraws the upper unit 51 to a location out of engagement with and removed from the lower unit 53, appropriate means (not shown) drives a cam 69 positioned below the support 33 to move the knock-out pin 67 upwardly against the lower end of the work piece 26. The knock-out pin 67 moves the work piece 26 upward to expose its upper end for easy removal of the piece 26 from the lower unit 53. Suitable means can transfer the work piece 26 to the third station 30.

Figure 5:
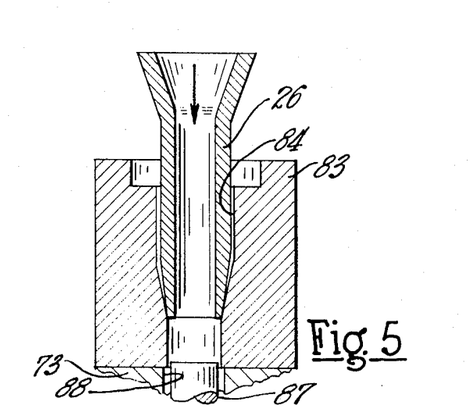
FIG. 5 is an enlarged section view in elevation illustrating an initial position at the third station of the intermediate shaped tubular member shown in FIG. 4.
Figure 6:
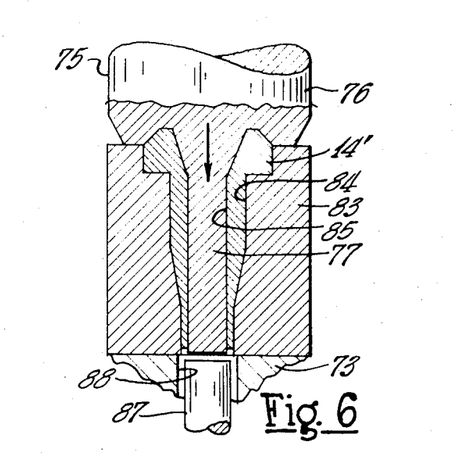
FIG. 6 is an enlarged section view in elevation illustrating a final shape of the tubular member at the third station according to the principles of the invention.

Referring to FIGS. 2, 5 and 6, the third station 30 is a die press including an upper unit 71 and a lower unit 73, which combine to form a matched die system operating to contour the work piece 26, e.g. shape its external surface, under compression, into a shorter work piece 14' of essentially final shape. The upper unit 71 has a die 75 with a base 76 and a plunger or quill 77. The die 75 is fixed securely at its base 76 to a retainer 79 and is normally made of hardened metal, e.g. carbide. As illustrated in FIG. 2 suitable means such as a press ram (not shown) reciprocates the upper unit 71 vertically. A shaft 81 secures at one end to the retainer 79 and at the other end to the press ram. As in the case of the second station 24, it has been useful to use a press ram having a capacity in the range of ten tons. The press ram operates to move the upper unit 71 away from the lower unit 73 and into pressing engagement therewith. Further, as in the case of the die 55 of the second station 24, the plunger or quill 77 is somewhat larger in transverse size at portions adjacent to the base 76. From the base 76 the plunger 77 reduces in cross sectional size to a minimum cross section spaced from the base 76, the plunger 77 extending uniformly along the remaining portion of the quill 77.

The lower unit 73 provides a die 83 that matches and aligns with the die 75 of the upper unit 71 to further shape the work piece 26. The die 83 is securely held in a stationary retainer 82 on the support 33; moreover, the die 83 has a die cavity or passageway 84, which cooperates to provide the work piece 26 with it final exterior configuration except for the step of finishing the terminating metering surface, e.g. by coining.

Initially, as the work piece 26 positions within the die cavity 84 of the lower portion or unit 73 as illustrated in FIG. 5. The lower or metering end of the work piece 26 abuts against a portion of reduced cross sectional area of the passageway 84. A portion of the upper end of the work piece 26 extends above the entrance to the passageway cavity 84.

In operation the press ram moves the upper unit 71 swiftly downwardly from a position spaced from the lower unit 73 to engage the unit 73, upsetting or "cold heading" the material of the work piece 26 into the shaped work piece 14' of essentially final shape. As the press ram through the shaft 81 moves the upper unit 71 into engagement with the lower unit 73, the plunger or quill 77 enters the cavity 84 of the die 83. The matching dies conform to "cold head" or cold work the metal or alloy of the work piece 26 to shape it, e.g. its external surface. The passageway 85 of the work piece 14 has the same dimensions as the passageway 65 and, as in the case of the work piece 26, has the shape of a taper at its base end. The passageway 85 has a uniform cross section throughout the remaining portion of its length. Thus, under compression, material of the work piece 26 moves towards the base or entrance end to form the work piece 14'.

The third position 30 provides for removal of the work piece 14' from the passageway 84 of the die 83. As shown in FIGS. 2, 5 and 6, a knock-out pin 87 extends upwardly in a passageway 88 in the lower unit 73 communicating with the passageway 84. When the press ram withdraws the upper unit 71 to a location out of engagement with and removed from the lower unit 73, appropriate means drives a cam 89 positioned below the support 33 to move the knock-out pin 87 upwardly against the lower end of the work piece 14' upward into a location within the passageway 84 that exposes its upper end. Suitable means transfers the shaped work piece 14' to the fourth station 32.

Figure 7:
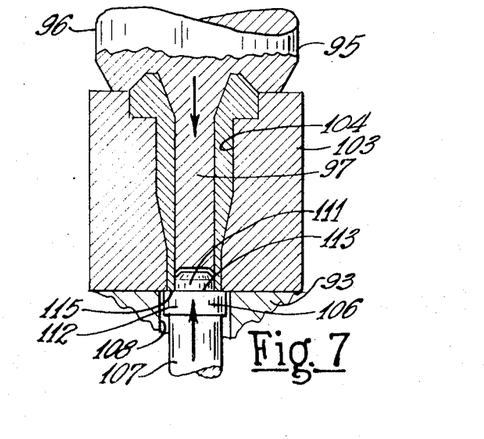
FIG. 7 is an enlarged section view in elevation illustrating the fourth station of the apparatus shown in FIG. 1 and wherein the metering exit end of the shaped longitudinal member is coined according to the principles of the invention.

The fourth station 32 is a die press station for coining the metering exit end of the work piece 14' into the shaped longitudinal member 14. This die press station includes an upper unit 91 and a lower unit 93 that forms a matched die system almost identical to the die system of the third station 30. The upper unit has a die 95 with a base 96 and a plunger or quill portion 97. The die 95 is securely fastened at the base 96 to a retainer 99 and is normally made of hardened metal, e.g. carbide. Except for its length the plunger 97 has the same shape and dimensions of the plunger 77 of the third station 30; the plunger or quill 97 is shorter than the plunger 77.

Suitable means reciprocates the upper unit 91. As shown in FIG. 2 the upper unit 91 reciprocates vertically. A shaft 101 secures at one end to the retainer 99 and at the other end to a press ram (not shown). It has been useful to use a press ram having a capacity in the range of ten tons to move the upper unit 91 away from the lower unit 93 and into pressing engagement therewith.

The lower unit 93 provides a die 103 that matches and aligns with the die 95 of the upper unit 91 to coin the metering exit end of the work piece 14'. The die 102 is held securely in a stationary retainer 102 on the support 33; moreover the die 103 has a die cavity or passageway 104, which has the shape and dimensions of the die passageway 84 of the second station 30.

A coining pin 106 located at the end of the die passageway 104 that shapes the metering end of the longitudinal member 14, viz. the lower end of passageway 104 in FIG. 2, provides the coining surface for the fourth station 32. A knock-out pin 107 extends upwardly through the support 33 and into a passageway 108 in the lower unit 93 communicating with the die passageway or cavity 104. The coining pin 106 is on upper end of the knock-out pin 107.

The coining pin 106 comprises a short cylindrical portion 111 and a flange portion 112 providing an annular coining surface 113 for the annular end surface 115 at the metering end of the shaped longitudinal member 14' (14).

In operation, the upper unit 91 moves swiftly downwardly from a position spaced from the lower unit 93 to engage the lower unit and move the shaped longitudinal member or work piece 14' located in the passageway 104 of the die 103 against the coining pin 106. As the press ram through the shaft 101 moves the upper unit 91 into working engagement with the lower unit 93, the plunger or quill 97 enters the passageway of the member 14' and the base 96 of the die 95 advances the metering end (and surface 115) of the member 14' into coining relationship with the coining pin 106. The leading end of the plunger 97 engages the end of the cylindrical portion 111 of the coining pin 106 within the passageway 85 of the work piece 14'. The annular end surface 115 presses against the annular coining surface 113 to compression smooth the surface 115 and slightly shorten the length of the member 14'. During coining the dies 83 and 95 support the member 14' to maintain its shape and the material of the member becomes somewhat compacted at the metering exit and the exit opening is accordingly provided with an exacting dimension about the circumferential surface portion of the member.

When the press ram withdraws the upper unit 91 after coining to a location of engagement with and remote from the lower unit 93, appropriate means drives a cam 117 positioned below the support 33 to move the knock-out pin 107 upwardly against the lower end of 115 of the shaped longitudinal member 14 for removal from the die 103.

In operation the apparatus of the four stations, 20, 24, 30 and 32, process a tubular member of predetermined length from a tubular supply into a shorter contoured longitudinal member 14. The first station 20 provides a tubular member 22 of predetermined length from a supply of tubular material 23. The second station 24 deforms the tubular member under compression into a shorter tubular work piece 26 of intermediate shape. The third station 30 further works the tubular work piece 26 under compression into a still shorter shaped longitudinal member 14', which has a configuration substantially in final or desired form with varying wall thickness along its length. The fourth station 32 coins the metering end 115 of the longitudinal member 14' to produce the shaped longitudinal member 14, which possesses a smooth and accurate metering surface 115. One may employ various dies to produce a shaped longitudinal member 14 of different external configurations and various straight or shaped passageways.

While it is preferred that all four stations be employed to fashion a shaped or contoured longitudinal member, it is possible to practice the invention employing only three of the four stations, viz. the first, second and third stations. One may employ other methods such as grinding in lieu of the coining operation of the fourth station 32 to finish the annular metering end surface 115 of the shaped longitudinal member 14. Because such a uniform and smooth surface obtains from coining as disclosed, it is preferred that one practice the invention by using the fourth station 32.

Figure 8:
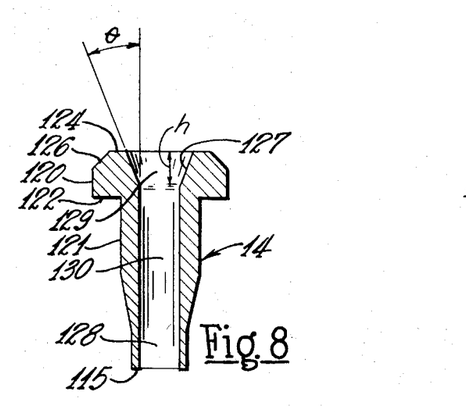
FIG. 8 is an enlarged section view in elevation of a shaped longitudinal member for a feeder according to the principles of the invention.

FIG. 8 is an enlarged showing of the shaped longitudinal member 14 produced by the apparatus of the invention illustrated in FIG. 2 and having varying wall thickness along its length for predetermined dissipation of thermal energy during passage of heat softened fiber forming material. At the base end of each of the shaped longitudinal members or tip structures 14 is an enlarged head portion 120. From the head portion 120 extends a body or shank portion 121 that is smaller in cross sectional area or size. The head portion 120 defines with the body or shank portion 121 an annular ledge surface 122. The termination region of the head 16 has an annular linear weld ridge 124 of restricted area approacking, as far as possible, a knife edge defined by chamfered surfaces 126 and 127. The annular linear ridge 124 engages the base plate 16 preparatory to welding. The shaped longitudinal member 14 has a passageway 128 (having the same dimensions as the passageway 85 of the work piece 14') extending along its length with a tapered passageway portion running from a location intermediate the ends of the passageway 128 in increasing cross section towards the base end for a distance normally from between 30 percent to 5 percent the entire length of the passageway 128 and terminating at the base end of the passageway. It is preferred that the tapered passageway portion be 20 percent of the entire length of the passageway 128. The chamfered surface 127 defines the surface of the tapered portion 129. The remaining portion of the passageway 128 is uniform, e.g. cylindrical. The uniform portion is denoted as 130. The variation in wall thickness may vary according to the needs of particular feeders.

Figure 9:
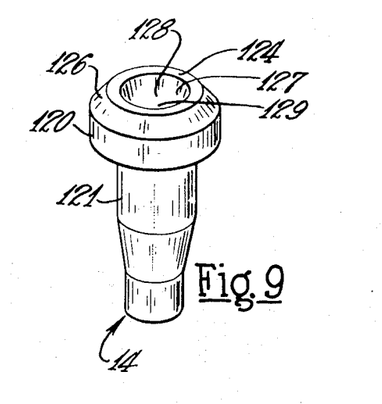
FIG. 9 is a perspective view of the shaped longitudinal member shown in FIG. 8.

While the illustrations of the shaped longitudinal member or tip structure 14 shown in FIGS. 8 and 9 are greatly enlarged for purposes of illustration the structures 14 are comparatively small, a large number of such structures being welded or joined to a base plate 16. As an example of actual size, each of the structures 14 is normally of a length from between 5/32 of an inch to ¼ of an inch in overall length. The head portion 14 is normally less than ⅛ of an inch in diameter.

The tapered portion 129 of the passageway 128 is an important aspect of the construction of the member 14. The taper must provide enough space to permit a predetermined amount of metal or alloy migration thereinto to give the passageway 128 a substantially uniform cross section throughout its entire length, e.g. cylindrical. During welding or joining of the shaped longitudinal members 14 to a base plate 16, the alloy or metal of the member 14 fuses with the base plate 14 particularly from the annular linear weld ridge 124, and metal flows into the zone of the tapered portion 129 as more fully disclosed hereinafter. In practice the height or length "h," of the tapered portion 129 runs normally from 0.03 of an inch to 0.06 of an inch, 0.04 of an inch being preferred. The angle of chamfer, or taper, shown as angle $\theta$ in FIG. 8, is normally in a range of from 15° to 30°.

Figure 10:
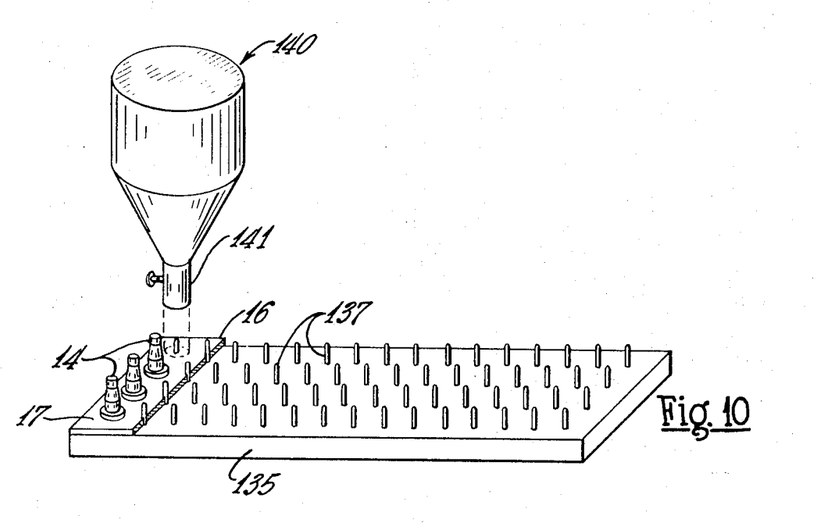
FIG. 10 is a perspective view showing apparatus for securely positioning shaped longitudinal members or orificed projections on an orificed base plate according to the principles of the invention.

FIG. 10 illustrates somewhat schematically apparatus for axial alignment of the shaped longitudinal members 14 with the orifices 18 and joining them with the base plate 16. A support 135 with protruding alignment spikes 137 is employed, each spike 137 corresponding to an orifice 18 in the base plate 16. One places the base plate 16 on the support 135 with each spike 137 extending individually through an orifice 18, to jut above the major surface 17 of the base plate 16. Suitable apparatus including a container such as vibrating feeder container 140 with a spout exit 141 deposits individual longitudinal members 14 on each spike 137 jutting out from the orifices 18 to the base plate 16. As shown in FIG. 10 the feeder container 140 is spaced from and somewhat above the aligned base plate 16. Suitable positioning apparatus and program control (not shown) accurately moves the container 140 in sequence to the individual spike locations. Alternately the support 135 may be moved by the positioning apparatus and program control, the container 140 remaining at the same indexing position.

The support 135 and spike 137 are made of different material. The support 135 is made of electrical conductive material. The alignment spikes 137 are normally made of a high heat resistant ceramic material.

Figure 11:
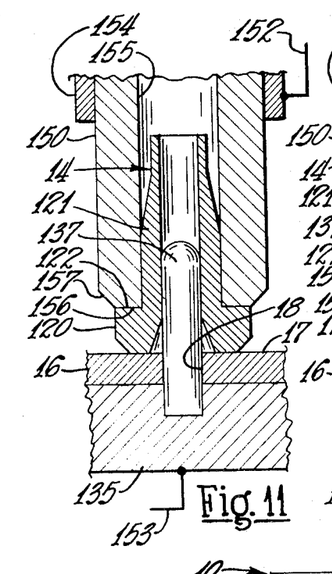
FIG. 11 is an enlarged sectional view in elevation showing the aligned engagement of a shaped longitudinal member with the base plate preparatory to initiating a welding operation.
Figures 12, 13:
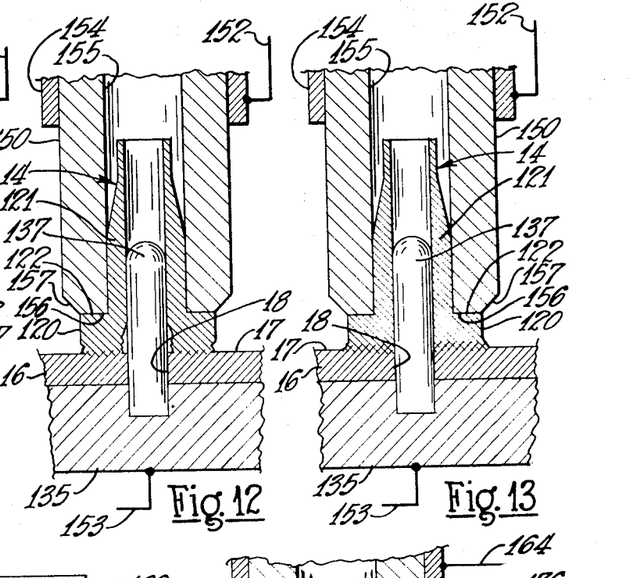
FIG. 12 is a sectional view in elevation illustrating the shaped longitudinal member and plate configuration of FIG. 11 during fusion in forming a weld.
FIG. 13 is a view similar to FIG. 12 showing a completed weld or fusion of the shaped longitudinal member to the plate.

Welding apparatus such as a press welding machine can be employed to join, i.e. weld, the shaped longitudinal members or tip structures 14 to the base plate 16. One arrangement is shown in FIGS. 11 through 13 where resisting welding apparatus employs two electrodes. The upper electrode is denoted by the numeral 150; the lower electrode is the support 135. Electrical connections 152 and 153 place the electrodes in a circuit having a high amperage electrical source. The electrical connection 152 provides electrical current to the upper electrode 150 through a collar 154.

The upper electrode 150 has a central bore 155 for telescopingly receiving the shank or body portion 121 of the tip structure 14. The annular lower end 156 of the electrode engages the annular surface or ledge 122 of the head portion 120. Preferably the upper electrode 150 is chamfered as shown as 157 to provide clearance to facilitate positioning the tip structures 14 in close relationship.

As shown in the FIGURES the annular ledge 122 and the electrode terminal surface 156 are substantial areas in comparison to the restricted area of the linear welded edge 124. In such an arrangement the head portion 120 accomodates substantial current flow with a minimum of heating so as to concentrate the heating through the material of the annular linear weld ridge 124, viz. by reason of the highest resistance to current flow through the tip structure 14.

Because the electrode 150 engages the tip structure 14 at the annular edge 120, such engagement is a substantial distance from the region of the annular linear weld ridge 124 and the material of the ridge 124 fuses with the base plates 16 without liability of the material at the weld becoming contaminated with the metal of the electrode 150.

During the welding process the welding apparatus establishes pressure on the movable electrode 150 to impinge the annular linear weld ridge 124 with the major surface 17 of the base plate 16. The width of the ride 124 is usually between 0.002 and 0.003 of an inch and should not exceed approximately 0.005 of an inch because increased current would be required to fuse the material of the ridge 124. Because of the force of the electrode 150, full area engagement occurs between the annular linear weld ridge 124 and the major surface 17 of the base plate 16. Thus, the resistance to current flow through the linear ridge 124 is uniform throughout its area, a uniform distribution of the fused material of the ridge 124 and the base plate 16 is being attained. The tapered portion 129 in the passageway 128 of the shaped longitudinal member 14 provides an annular space for inward migration or flow of the material of the ridge 124 and adjacent areas during welding.

FIG. 12 illustrates an initial fusion state. Under the pressure of the electrode 150 and heat generated by the passage of electrical current the material, especially the material of the ridge 124, migrates or flows inwardly to fill the space of the tapered portion 129 of the passageway 128.

FIG. 13 illustrates the complete weld or fusion of the material of the ridge 124 to the surface 17 of the base plate 16. It should be noted that the material of the ridge 124 has totally filled the space of the tapered portion 129. The support of the ceramic pin 137 has provided a passageway portion at the weld zone that is substantially smooth and of dimensions providing a cylindrical passageway 128 throughout the length of the tip structure 14. Such welding provides an effective seal juncture between the tip structure 14 and the base plate 16 without flow of the fused material outwardly of the head portion 120. Moreover, it is found that the weld seal provided withstands the high temperature of molten glass without impairment of such seal.

Upon completion of the welding the electrode 150 and support 135 are removed from the base plate 16.

Figure 14:
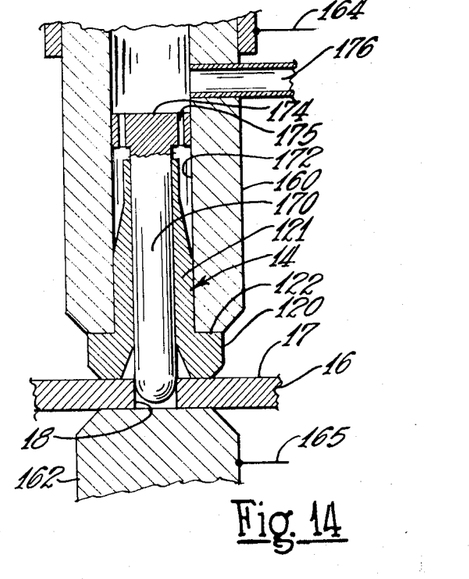
FIG. 14 is an enlarged sectional view in elevation showing the aligned engagement of the shaped longitudinal member with the base plate preparatory to initiating a welding operation where modified welding apparatus is employed.

FIG. 14 illustrates modified apparatus for joining the shaped longitudinal members or tip structures 14 to the major surface 17 of the base plate 16. In the case of the arrangement shown in FIG. 14 one does not employ the support 135 and alignment spikes 137. In a resistant welding apparatus the arrangement employs an upper electrode 160 and a lower electrode 162. Electrical connections or lines 164 and 165 place the electrodes in a circuit having a high amperage electrical source.

The upper electrode 160 holds a pin 170 within a central bore 172. The pin 170 has a base portion 174 that tightly fits into the central bore 172. The base portion 174 has openings 175 extending therethrough for communication of the passageway 172 at either side of the base portion 174.

A suitable fluid carrying means 176 communicates with the central bore 172 at one end and connects at the other end to a source of reduced pressure or vacuum such as a conventional suction pump.

An operator mounts the shaped longitudinal member 14 in telescoping relationship on the pin 170 with the pin 170 terminating beyond the tapered passageway portion 129. When the member 14 is in position on the pin 170, the shank or body portion of the member 14 extends into the center bore portion 72 and the head portion 120 substantially obstructs the entrance of the central bore 172. Because of the reduced pressure in the bore, the electrode 160 retains the shaped longitudinal member 14 on its end. Suitable positioning apparatus and program control (not shown) accurately moves the electrode 160 in sequence to the individual openings 18 in the base plate 16. Alternately the base plate 16 may be moved by the positioning apparatus and program control, the electrodes 160 and 162 remaining at the same indexing position.

As in the case of the welding process indicated in FIGS. 11 through 13, the electrode 160 presses the annular linear weld ridge 124 into intimate relationship onto the major surface 17 of the base plate 16. Moreover, as in the case of the alignment pins 137, the pin 170 extends into the orifices 18 of the base plate 16. Thus, the pin 170 provides support for the migrating material of the ridge 124 to produce a substantially longitudinal passageway in the shaped longitudinal member 14.

Alternately, an upper and lower electrode may be employed without any associated pin, e.g. pins 137 and 170.

Figure 15:
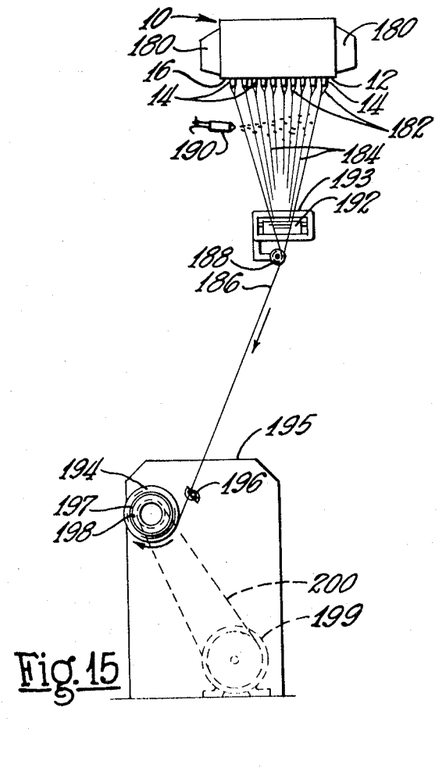
FIG. 15 is a somewhat diagramatic front elevation view of a stream feeder at a glass filament forming position according to the principles of the invention.

FIG. 15 shows a process for forming continuous glass filaments from heat softened glass employing a feeder according to the principles of the invention where the glass filaments are combined into a strand, which is subsequently collected as a wound package. FIG. 15 illustrates the stream feeding container 10 that holds a supply of molten glass. The container 10 may connect to a forehearth (not shown) that supplies molten glass from a furnace or may connect to a means for supplying glass (not shown) such as glass marbles that are reduced to a heat softened condition in a melter or other means associated with the stream feeding container 10. Located at the ends of the container 10 are terminals 180 that connect to a source of electrical energy to supply heat by conventional resistance heating to the glass held in the stream feeding container 10 to maintain the molten glass at a proper fiber forming temperature and viscosity. Moreover, the container 10 incorporates the feeder 12 that includes a plurality of contoured longitudinal members or tip 14 on the base plate 16.

The shaped longitudinal members 14 deliver streams of molten glass from the stream feeding container 10. The molten streams 16 are attenuated into individual continuous glass filaments 184 and combined into a strand 186 by a gathering shoe 188 located below the stream feeding container 10.

While the filaments 184 may be protected only by application of water to them, it is desireable in most instances to apply to them a conventional sizing or other coating material. A nozzle 190 may be located near the bottom 16 to spray water onto the newly formed filaments 184, preferably prior to combining the filaments 184 into the strand 186. An applicator 192 supported within a housing 193 may be provided as shown in FIG.

15 to apply the sizing of the coating material to the filaments 184. The applicator 192 may be any suitable means known to the art such as an endless belt that moves to pass through the sizing or coating fluid held in the housing 193. As the filaments 184 pass across the surface of the applicator 192, some of the fluid material on the applicator transfers to them.

The strand 186 collects as a wound package 194 on a winder 195. Strand handling apparatus 196 moves the advancing strand 184 back and forth along the length of the package 194 as the strand winds upon a collector such as a tube 197 that has been telescoped over a spindle or collet 198, the collet 198 being journaled for rotation on the winder 195. A motor 199 within the winder 195 appropriately rotates the mandrel 198 through a non-slipping belt 200. Appropriate conventional means (not shown) moves the strand handling apparatus 196.

It is apparent that, within the scope of the invention, modifications and different arrangements may be made other than as herein disclosed. The present disclosure is merely illustrative, the invention comprehending all variations thereof.

I claim:

1. Apparatus for producing an orificed feeder for supplying streams of filament forming material comprising: means for cutting tubular material into tubular members of predetermined length;
    means for deforming each of the tubular members into a shorter longitudinal member having a thicker walled end portion and a passageway extending lengthwise through such shorter member;
    means for supplying a plate with a flat surface having orifice openings for passage of filament forming material therethrough; and
    means for joining the shorter longitudinal members at their thicker walled end portions to the flat surface of the plate with their passageways in communication with the orifice openings.

2. Apparatus recited in claim 1 further including means for coining the end of the shorter shaped longitudinal members opposite the thicker walled end portions before joining such members to the plate.

3. Apparatus for producing a feeder for supplying streams of molten glass for attenuation into glass filaments comprising:
    means for cutting tubular material into tubular members of predetermined length;
    means for deforming each of the tubular members into a shorter longitudinal member having a passageway extending lengthwise through it with an entrance end and an exit end and having walls of varying thickness along its length for predetermined dissipation of thermal energy from molten glass passing through such shorter member, the passageway having a portion shaped with a taper running from a location intermediate its ends in increasing size to the entrance end;
    means for welding the shorter members to a plate with orifice openings wherein each shorter member is in axial alignment with an opening; and
    means for welding walls to the orificed plate to contain molten glass to be fed by the feeder.

4. The apparatus of claim 1 further including means for joining walls to the orificed plate to contain filament forming material to be fed by the feeder.

5. Apparatus for forming an orificed feeder for flowing streams of filament forming material comprising:
    means for providing tubular members of uniform wall thickness and predetermined length;
    means for deforming the tubular members under compression to form shorter longitudinal members having a thicker walled end portion and a passageway;
    means for providing a plate with a flat surface and orifice openings for passage of the filament forming material therethrough;
    means for joining the shorter longitudinal members at their thicker walled end portions to the flat surface of the plate with their passageways in communication with the orifice openings; and
    means for joining walls to the orificed plate to contain filament forming material to be fed by the feeder.

* * * * *